(12) United States Patent  
Islam et al.

(10) Patent No.: US 8,401,332 B2  
(45) Date of Patent: Mar. 19, 2013

(54) OPTICAL PATTERN RECOGNITION TECHNIQUE

(75) Inventors: Mohammed Nazrul Islam, Norfolk, VA (US); K. Vijayan Asari, Virginia Beach, VA (US); Mohammad A. Karim, Virginia Beach, VA (US)

(73) Assignee: Old Dominion University Research Foundation, Norfolk, VA (US)

( * ) Notice: Subject to any disclaimer, the term of this patent is extended or adjusted under 35 U.S.C. 154(b) by 1000 days.

(21) Appl. No.: 12/386,814

(22) Filed: Apr. 23, 2009

(65) Prior Publication Data

US 2009/0297021 A1 Dec. 3, 2009

Related U.S. Application Data

(60) Provisional application No. 61/125,313, filed on Apr. 24, 2008.

(51) Int. Cl.  
*G06K 9/62* (2006.01)

(52) U.S. Cl. ........................................ 382/278

(58) Field of Classification Search .................. None  
See application file for complete search history.

(56) References Cited

U.S. PATENT DOCUMENTS

| | | | |
|---|---|---|---|
| 4,838,644 A | 6/1989 | Ochoa et al. | |
| 5,274,716 A | 12/1993 | Mitsuoka et al. | |
| 5,485,312 A | 1/1996 | Horner et al. | |
| 5,524,845 A | 6/1996 | Sims et al. | |
| 6,042,050 A | 3/2000 | Sims et al. | |
| 6,804,412 B1 | 10/2004 | Wilkinson | |
| 7,317,814 B2 | 1/2008 | Kostrzewski et al. | |
| 7,428,099 B1 | 9/2008 | Javidi et al. | |
| 7,483,569 B2 | 1/2009 | Bhagavatula et al. | |

FOREIGN PATENT DOCUMENTS

| | | |
|---|---|---|
| GB | 2317487 | 3/1998 |
| GB | 2317487 A | 3/1998 |

OTHER PUBLICATIONS

Alam et al, Real Time Fingerprint Identification, IEEE, 2000, pp. 434-440.*  
Islam, et. al., "Distortion-Invariant Pattern Recognition Using Synthetic Discriminant-Function Based Shifted Phase-Encoded Joint Transform Correlator"; Optical Engineering, vol. 47 108201 (2008).  
Purohit, et. al., "Target Detection Using Adaptive Progressive Threshold Based Shifted Phase-Encoded Fringe-Adjusted Joint Transform Correlator"; International J. of Electrical, Computer and Systems Engineering, Feb. 4, 2008, pp. 277-282.  
Fahad, et. al., "Weighted Reference Shifted Phase Encoded FJTC Technique for Class Associative Target Detection", 3rd Int'l. Conf. on Electrical & Computer Engineering, Dec. 28-30, 2004, pp. 426-429.  
Yu, et. al., "Phase-Encoded Joint Transform Correlator by Use of Logarithmic Transformation", 8th Annual Conf. on Electronic Measurement and Instrumentation, ICEMI 2007.

(Continued)

*Primary Examiner* — Brian P Werner  
(74) *Attorney, Agent, or Firm* — Williams Mullen

(57) ABSTRACT

Disclosed is a distortion invariant system, method and computer readable medium for detecting the presence of one or more predefined targets in an input image. The input image and a synthetic discriminant function (SDF) reference image are correlated in a shift phase-encoded fringe-adjusted joint transform correlation (SPFJTC) correlator yielding a correlation output. A peak-to-clutter ratio (PCR) is determined for the correlation output and compared to a threshold value. A predefined target is present in the input image when the PCR is greater than or equal to the threshold value.

18 Claims, 12 Drawing Sheets

OTHER PUBLICATIONS

Islam, et. al., "Distortion-Invariant Pattern Recognition Using Synthetic Discriminant Function-Based Shifted Phase-Encoded Joint Transform Correlator", Optical Engineering, vol. 47, (Oct. 2008) pp. 108201-1-9.

Islam, et. al., "Distortion-Invariant Target Detection Using Shifted-Reference Joint Transform Correlator", Proc. of SPIE, vol. 7072.

Islam, et. al., "Optical Pattern Recognition Using Multiple Phase-Shifted-Reference Fringe-Adjusted joint Transform Correlation", Optical Engineering, vol. 47(9), Sep. 2008, pp. 097204/1-9.

Islam, et. al., "Pattern Recognition Using Gaussian-Filtered, Shift Phase-Encoded Fringe-Adjusted Joint Transform Correlation", Proc. of SPIE vol. 6977, pp. 69770A, 1-8.

Purohit, et. al., "Target Detection Using Adaptive Progressive Thresholding Based Shifted Phase-Encoded Fringe-Adjusted Joint Transform Correlator", PWASET, vol. 31 Jul. 2008, ISSN 2070-3740, pp. 36-41.

Alam, et. al., "Improved Multiple Target Tracking via Global Motion Compensation and Optoelectronic Correlation", IEEE Transactions on Industrial Electronics, vol. 54, No. 1, Feb. 2007, pp. 522-529.

Islam, et. al., "Use of Shifted Phase-Encoded Joint Transform Correlation for Class-Associative Color Pattern Recognition," Proc. of SPIE, vol. 6245, pp. 1-8.

Haider, et. al., "Enhanced Class Associative Generalized Fringe-Adjusted Joint Transform Correlation for Multiple Target Detection," Optical Engineering 45(4) 048201 (Apr. 2006), pp. 1-10.

Haider, et. al., "Shifted Phase-Encoded Fringe-Adjusted Joint Transform Correlation for Multiple Target Detection," Optics Communications, Pub. 2004, Elsivier, B.V. pp. 69-88.

Alam, et. al., "Heteroassociative Multiple-Target Tracking by Fringe-Adjusted Joint Transform Correlation", Applied Optics, vol. 43, No. 2 Jan. 10, 2004, pp. 358-365.

Alam, et. al., "Class-Associative Multiple Target Detection by use of Fringe-adjusted Joint Transform Correlation", Applied Optics, vol. 41, No. 35, Dec. 10, 2002, pp. 7456-7463.

Bal, et. al., "Dynamic Target Tracking with Fringe-Adjusted Joint Transform Correlation and Template Matching", Applied Optics, vol. 43, No. 25, Sep. 1, 2004, pp. 4874-4881.

* cited by examiner

Figure 5: Generation of synthetic discriminant function (SDF): (a – l) training images, (m) SDF image Figure 6: Recognition of boat: (a) input scene, (b) correlation output Figure 7: Recognition of boat in different orientation: (a) input scene, (b) correlation output Figure 8: Recognition of boat in noisy environment: (a) input scene, (b) correlation output Figure 9: Rejection of non-target boat: (a) input scene, (b) correlation output Figure 10: Recognition of multiple boats in complex scene: (a) input scene, (b) correlation output Figure 11: Class-associative boat recognition: (a) input scene, (b) correlation output

OPTICAL PATTERN RECOGNITION TECHNIQUE

CROSS REFERENCE TO RELATED APPLICATIONS

This application is related to and claims priority to co-pending U.S. Provisional Patent Application 61/125,313 filed on Apr. 24, 2008 entitled "Optical Pattern Recognition Technique."

BACKGROUND OF THE INVENTION

The detection and recognition of targets or objects of interest in a given input still image or video image is a challenging issue for most security and monitoring applications, whether located at airports, shipping ports, office complexes, or other public places. Among several pattern recognition techniques, an optical joint transform correlation (JTC) technique has been found to be a versatile tool for real-time applications. The JTC technique provides a number of advantages over other correlation techniques, such as the Vanderlugt filter, in that it allows real-time updating of the reference image, permits parallel Fourier transformation of the reference image and input scene, operates at video frame rates, and eliminates the precise positioning requirement of a complex matched filter in the Fourier plane.

However, the classical JTC technique suffers from poor correlation discrimination, wide sidelobes, a pair of correlation peaks for each object, and strong zero-order correlation terms, which often overshadow the desired cross correlation peak. A number of modifications have been made in the design of the classical JTC technique, namely binary JTC, phase-only JTC, and fringe-adjusted JTC (FJTC). These may yield improved performance in some cases, but they are not yet successful in yielding sharp correlation with high discrimination between target and non-target objects present in the input image and operating in noisy conditions.

A recently developed shifted phase-encoded fringe-adjusted JTC (SPFJTC) technique has been found to be efficient and successful in yielding distinct correlation performance with a single delta-function-like correlation peak that has a high level of discrimination between the target and the non-targets or background; thus, it can operate in a noisy environment. A class-associative target detection system can be developed using the SPFJTC technique for simultaneous recognition of multiple reference objects in the same input scene, where the processing architecture and parameters do not need to adjust depending upon the number of members in the target class and type of the input scene. Though the technique works in noisy cases, it is not yet invariant to distortions in the input scene, such as illumination, scale and rotation variations.

SUMMARY

Disclosed is a distortion invariant system, method and computer readable medium for detecting the presence of one or more predefined targets in an input image. The input image and a synthetic discriminant function (SDF) reference image are correlated using a shifted phase-encoded fringe-adjusted joint transform correlation (SPFJTC) technique yielding a correlation output. A peak-to-clutter ratio (PCR) is determined for the correlation output and compared to a threshold value. A predefined target is present in the input image when the PCR is greater than or equal to the threshold value.

The SDF reference image is obtained from a plurality of training images by constructing a synthesized weighted average function of the training images that contain weighting coefficients. The coefficients are initialized to unity and an SDF reference image is calculated for each iteration. A correlation matrix is created by comparing each training image with the current SDF reference. The correlation peak intensities are determined for each training image and an error value based on the maximum correlation peak intensity and minimum correlation peak intensity among the training images is calculated. If the error value is not within a predetermined threshold, then the coefficients are updated for the next iteration until the error value is within the predefined threshold.

For multiple targets in an image all of the SDF reference images are combined to form a composite SDF reference image which is then Fourier transformed and fed into two parallel processing channels wherein the second channel applies a 180° phase shift. A random phase mask is applied to each channel followed by an inverse Fourier transform on each channel. The input image is then introduced into to each channel and another Fourier transform is performed on each channel. A joint power spectrum (JPS) is calculated from individual signals in each channel and the difference in the JPS between the channels is determined. The same random phase mask is then applied to the JPS difference followed by applying a fringe-adjusted filter (FAF) to obtain an enhanced JPS. An inverse Fourier transform is performed on the enhanced JPS to obtain the final correlation output for each target.

DETAILED DESCRIPTION OF PREFERRED EMBODIMENTS

Embodiments of the present invention describe an optical pattern recognition system incorporating a technique for use with a distortion-invariant class-associative pattern recognition system. The system employs a modified SPFJTC technique for distinct correlation performance. The SPFJTC technique is modified by incorporating a synthetic discriminant function (SDF) for a reference image to achieve a correlation performance that is distortion-invariant. A set of reference images with probable scale and rotation variations is utilized to train the system prior to real-time operation. Multiple SDF reference images corresponding to different target objects in the reference class can then be combined to form a composite SDF reference image, which is then fed to the class-associative SPFJTC technique. This technique can detect multiple objects from the reference class simultaneously by producing a high discrimination between targets and non-targets even in noisy environment.

Figure 1:
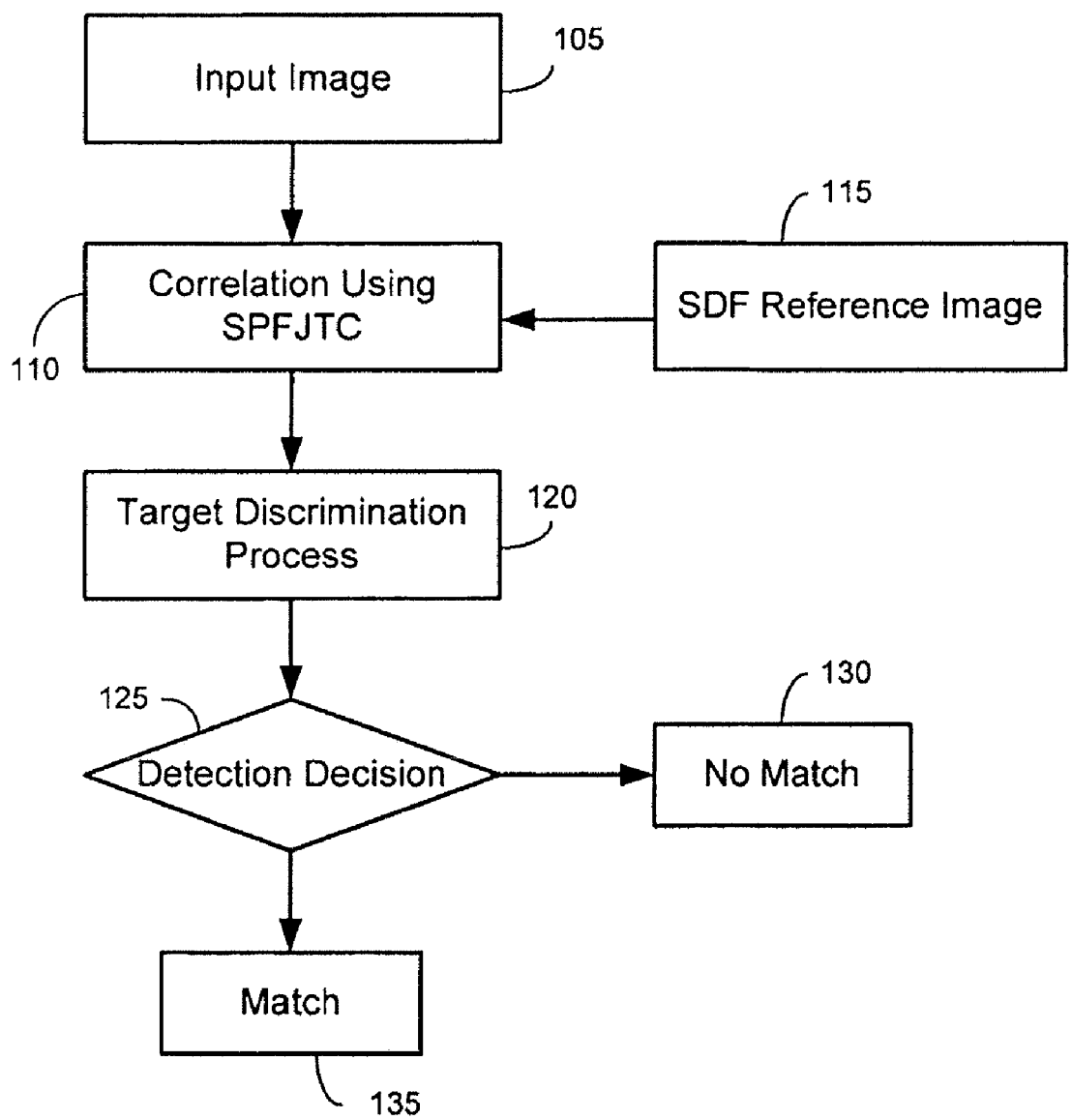
FIG. 1 is a block diagram of an embodiment of an optical pattern detection system.

A block diagram of the target detection system is illustrated in FIG. 1. An input image 105 is supplied as input to an SPFJTC correlator 110 where it is correlated with a SDF reference image taken 115. The SDF reference image can be stored in a database or digital library. A target discrimination process 120 is then applied to the correlation result to determine 125 whether the input image contains any recognized targets 130, 135.

Figure 2:
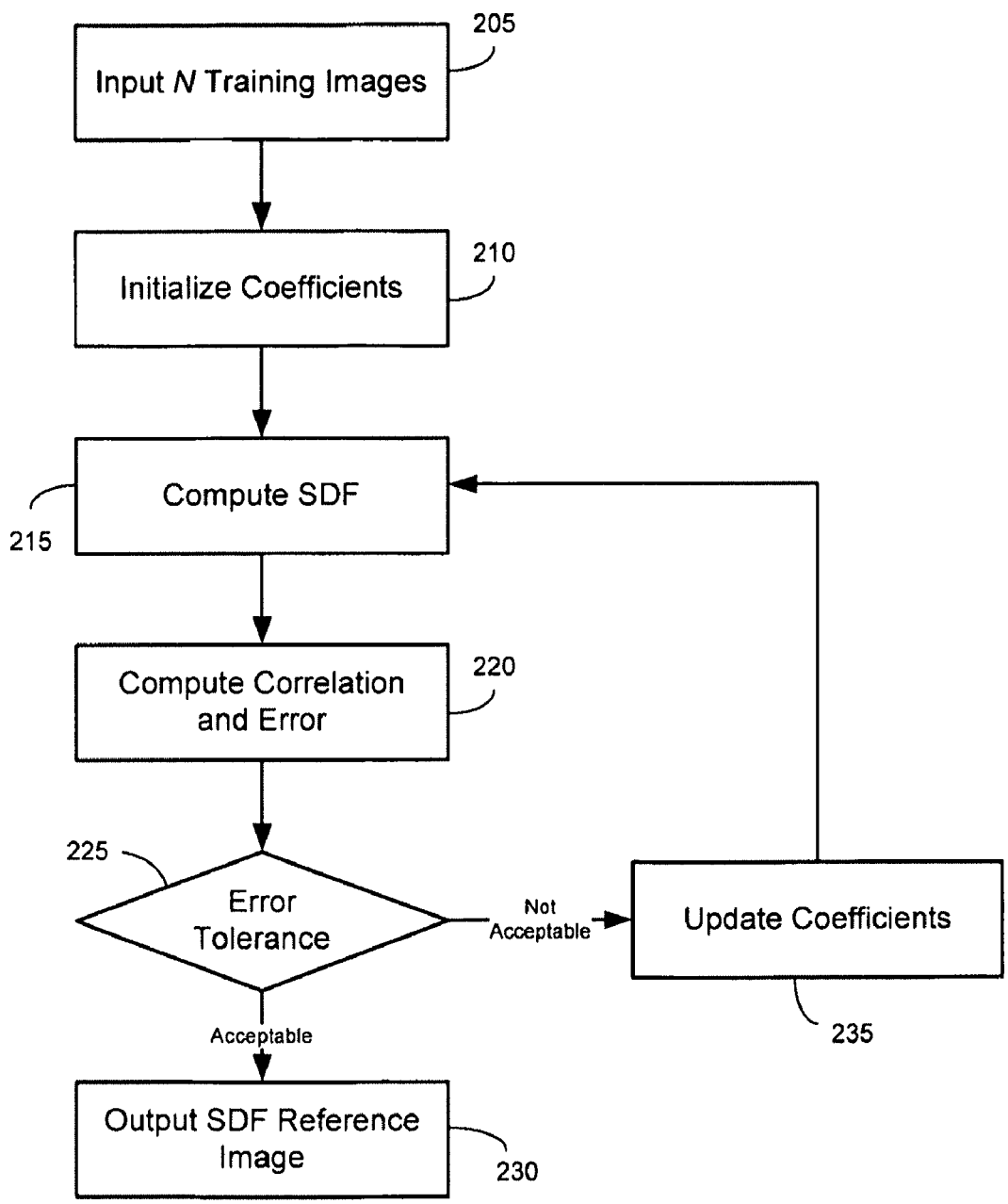
FIG. 2 is a block diagram of the generation of the synthetic discriminant function.

FIG. 2 illustrates a block diagram for a process used to generate the synthetic discriminant function (SDF) from a set of training images 205. In one example, there are N training images, $r_1(x,y), r_2(x,y), \ldots, r_N(x,y)$ that contain almost all the possible distorted features of a to-be-detected target. Here x and y denote the spatial coordinates of images under consideration. These training images are used to construct the spatial SDF $r_{SDF}(x,y)$. The SDF can be synthesized as a weighted average function of the training images as given by:

$$r_{SDF}(x, y) = \frac{\sum_{i=1}^{N} a_i r_i(x, y)}{\sum_{i=1}^{N} a_i} \quad (1)$$

where $\alpha_i$ is the associated coefficient for each of the respective training images. The coefficients are selected such that the SDF produces a correlation peak of uniform height with each of the training images. For this purpose, a simplified iterative process is utilized, where the iteration begins by initializing all the coefficients equal to unity 210.

$$\alpha_i = 1.0, i = 1, 2, 3 \quad (2)$$

After each iteration, the resultant SDF obtained from Eq. (1) 215 is used as the reference image with which each of the training images are compared to form a correlation matrix 220 as given by:

$$\text{corr}_i^k(x,y) = r_{SDF}^k(x,y) \oplus r_i(x,y) \quad (3)$$

where k is the iteration number and $\oplus$ represents the correlation operation.

In the next step of SDF formation, the correlation peak intensities corresponding to each training image are evaluated as:

$$C_i^k \in \max(\text{corr}_i^k) \quad (4)$$

Then the maximum and minimum correlation peak intensities among the training image components are estimated as:

$$C_{max}^k \in \max(C_i^k) \quad (5)$$

$$C_{min}^k \in \min(C_i^k) \quad (6)$$

To ensure equal correlation peak intensity for all images in the training set, the coefficients $\alpha_i$ of Eq. (1) are updated 235 using the empirical relation given by:

$$\alpha_i^{k+1} = \alpha_i^k + (C_{max}^k - C_i^k)\delta \quad (7)$$

where $\delta$ is the relaxation factor which determines the rate of changing the coefficients from one iteration to the next and $\alpha_i^0 = 1.0, i=1, 2, 3 \ldots$. The iterative process is continued until the difference between the maximum and the minimum correlation peak intensities reduces to an error limit 225, expressed as:

$$\xi^k = \frac{(C_{max}^k - C_{min}^k)}{C_{max}^k} \quad (8)$$

where $\xi^k$ is the error calculated in the k-th iteration, $C_{max}^k$ and $C_{min}^k$ are the maximum and the minimum correlation peaks, respectively, computed in the k-th iteration. The SDF image $r_{SDF}(x, y)$ thus obtained after the final iteration is used as the SDF reference image 230 in the class-associative target detection process described below.

Figure 3:
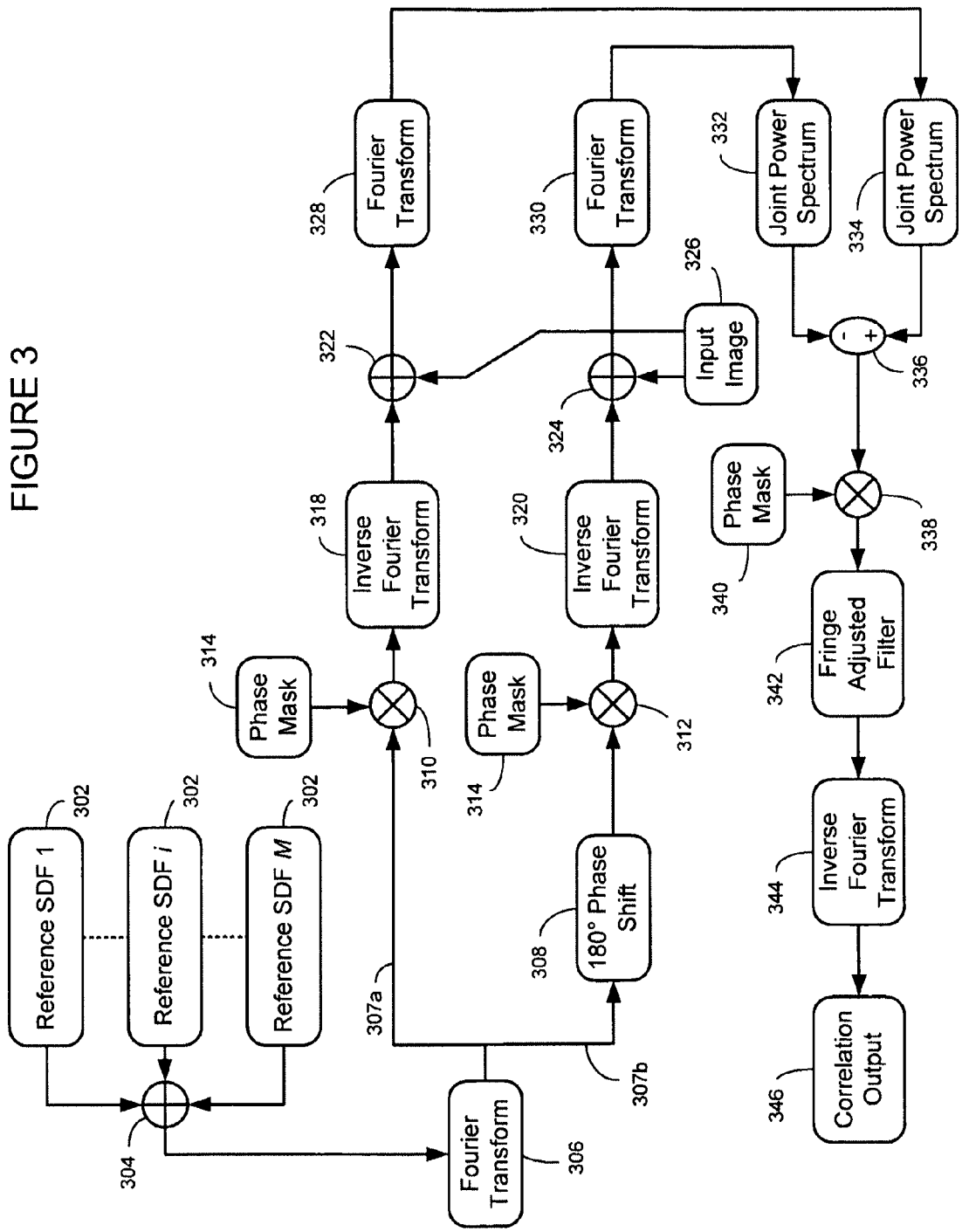
FIG. 3 is a block diagram of a shifted phase-encoded fringe-adjusted joint transform correlation.

FIG. 3 illustrates a block diagram of a shifted phase-encoded fringe-adjusted joint transform correlation (SPFJTC) technique for distortion-invariant class-associative pattern recognition. For class-associative pattern recognition purposes, the reference class of objects may include multiple targets which need be detected simultaneously in a given input scene. Therefore, the individual SDF images 302 obtained from different targets in the reference class are combined 304 to form a composite SDF reference image for the correlation operation. Since the reference images will be available prior to operation, calculation of individual SDF reference images and finally of the composite SDF reference image can be performed offline and will not affect the real-time operation of the pattern recognition system.

If there are M number of objects in the reference class, each having an SDF reference image 302, $r_{SDFi}(x, y)$, the composite SDF reference image can then be obtained 304 according to:

$$r_{SDF}(x, y) = \sum_{i=1}^{M} r_{SDFi}(x, y) \quad (9)$$

The composite SDF reference image is then Fourier transformed 306 and fed into two parallel processing channels 307a, 307b, where one channel 307b introduces a 180 degree phase shift 308. A random phase mask 314, $\phi(x,y)$, is applied to both the channels 307a, 307b individually. The two resultant signals can be expressed as:

$$S_1(u,v) = |R_{SDF}(u,v)| \exp[j\Phi_r(u,v)] \times \Phi(u,v) \quad (10)$$

$$S_2(u,v) = |R_{SDF}(u,v)| \exp[j\pi] \exp[j\Phi_r(u,v)] \times \Phi(u,v) \quad (11)$$

where u and v are mutually independent frequency domain variables scaled by a factor of $2\pi/f\lambda$, $\lambda$ is the wavelength of collimating light, f is the focal length of the Fourier lens, $R_{SDF}(u,v)$ and $\Phi_r(u,v)$ are the amplitude and phase, respectively, of the Fourier transform of $r_{SDF}(x,y)$, and $\Phi(u,v)$ is the Fourier transform of $\phi(x,y)$. The inverse Fourier transform 318, 320 of the above signals give the phase-encoded reference SDF images as:

$$s_1(x, y) = r_{SDF}(x, y) \otimes \phi(x, y) = \sum_{i=1}^{M} r_{SDFi}(x, y) \otimes \phi(x, y) \quad (12)$$

$$s_2(x, y) = -r_{SDF}(x, y) \otimes \phi(x, y) = -\sum_{i=1}^{M} r_{SDFi}(x, y) \otimes \phi(x, y) \quad (13)$$

where ⊕ 310, 312 represents the convolution operation. Note the negative sign in Eq. (13) due to of the 180 degree phase shift 308.

Next, the input image 326 containing different objects, $t_i(x,y)$, is introduced to both the channels 307a, 307b including the phase-encoded reference SDF images to form two joint images 322, 324 as given by:

$$f_1(x, y) = s_1(x, y) + \sum_{i=1}^{K} t_i(x, y) \qquad (14)$$

$$= \sum_{i=1}^{M} r_{SDFi}(x, y) \otimes \phi(x, y) + \sum_{i=1}^{K} t_i(x, y)$$

$$f_2(x, y) = s_2(x, y) + \sum_{i=1}^{K} t_i(x, y) \qquad (15)$$

$$= -\sum_{i=1}^{M} r_{SDFi}(x, y) \otimes \phi(x, y) + \sum_{i=1}^{K} t_i(x, y)$$

where K is the total number of objects in the input scene. From Fourier transformation 328, 330 of the above equations, we can calculate the magnitude spectrum of individual signals, which is defined as the joint power spectrum (JPS). The JPS signals in two channels 332, 334 are given by:

$$|F_1(u, v)|^2 = \qquad (16)$$

$$\sum_{i=1}^{M} |R_{SDFi}(u, v)\Phi(u, v)|^2 + \sum_{i=1}^{M} \sum_{j=1, j\neq i}^{M} R_{SDFi}(u, v) R^*_{SDFj}(u, v) +$$

$$\sum_{i=1}^{M} \sum_{j=1, j\neq i}^{M} R^*_{SDFi}(u, v) R_{SDFj}(u, v) + \sum_{i=1}^{K} |T_i(u, v)|^2 +$$

$$\sum_{i=1}^{M} \sum_{j=1, j\neq i}^{K} R_{SDFi}(u, v) T^*_j(u, v) \Phi(u, v) +$$

$$\sum_{i=1}^{M} \sum_{j=1, j\neq i}^{K} R^*_{SDFi}(u, v) T_j(u, v) \Phi^*(u, v) +$$

$$\sum_{i=1}^{K} \sum_{j=1, j\neq i}^{K} T_i(u, v) T^*_j(u, v) + \sum_{i=1}^{K} \sum_{j=1, j\neq i}^{K} T^*_i(u, v) T_j(u, v)$$

$$|F_2(u, v)|^2 = \qquad (17)$$

$$\sum_{i=1}^{M} |R_{SDFi}(u, v)\Phi(u, v)|^2 + \sum_{i=1}^{M} \sum_{j=1, j\neq i}^{M} R_{SDFi}(u, v) R^*_{SDFj}(u, v) +$$

$$\sum_{i=1}^{M} \sum_{j=1, j\neq i}^{M} R^*_{SDFi}(u, v) R_{SDFj}(u, v) + \sum_{i=1}^{K} |T_i(u, v)|^2 -$$

$$\sum_{i=1}^{M} \sum_{j=1, j\neq i}^{K} R_{SDFi}(u, v) T^*_j(u, v) \Phi(u, v) -$$

$$\sum_{i=1}^{M} \sum_{j=1, j\neq i}^{K} R^*_{SDFi}(u, v) T_j(u, v) \Phi^*(u, v) +$$

$$\sum_{i=1}^{K} \sum_{ij1, j\neq i}^{K} T_i(u, v) T^*_j(u, v) + \sum_{i=1}^{K} \sum_{j=1, j\neq i}^{K} T^*_i(u, v) T_j(u, v)$$

where $F_1(u, v)$ and $F_2(u, v)$ are Fourier transformations of $f_1(x, y)$ and $f_2(x, y)$. It can be observed from the above equations that both the JPSs contain a number of terms each of which can produce an auto-correlation or cross-correlation signal. In the next step, the JPS in Eq. (17) is subtracted 336 from that in Eq. (16) and the resultant signal is multiplied 338 again by the same phase mask 340 $\Phi(u, v)$ used earlier. The modified JPS is expressed as:

$$P(u, v) = [|F_1(u, v)|^2 - |F_2(u, v)|^2]\Phi(u, v) = \qquad (18)$$

$$2\left[\sum_{i=1}^{M} \sum_{j=1, j\neq i}^{K} R_{SDFi}(u, v) T^*_j(u, v) \Phi^2(u, v) + \right.$$

$$\left. \sum_{i=1}^{M} \sum_{j=1, j\neq i}^{K} R^*_{SDFi}(u, v) T_j(u, v) \right]$$

Inverse Fourier transformation of Eq. (18) will yield the desired correlation output. It can be observed that because of the above operation, the extra auto-correlation terms, which are present in a classical JTC technique, are automatically eliminated. The JPS in Eq. (18) contains only two cross-correlation terms. However, the first term will produce a correlation which will be scattered in various directions in the space because of the random nature of the phase mask $\phi(x,y)$. Therefore, ultimately only the second term will produce a distinct correlation peak in the output plane for a matching between the input image object and any of the reference objects.

The correlation signal obtained from inverse Fourier transformation of Eq. (18) may still contain spurious signals around the desired peak signal, which will make it difficult to accurately locate the target in the input scene. Therefore, a fringe-adjusted filter (FAF) 342 is developed to enhance the correlation performance of the technique. The filter transfer function can be expressed as:

$$H(u, v) = \frac{C(u, v)}{D(u, v) + \sum_{i=1}^{M} \alpha_i |R_{SDFi}|^2} \qquad (19)$$

where $C(u,v)$ and $D(u,v)$ are either constants or functions of u and v. The parameter $C(u,v)$ is adjusted to avoid having an optical gain greater than unity, while $D(u,v)$ is used to overcome the pole problem otherwise associated with a normal filter. The parameters $\alpha_i$'s in Eq. (19) are constants such that $\Sigma\alpha_i=1$. The relative magnitudes of $\alpha_i$ can be varied depending upon the energy content of the power spectra of the reference SDF images in the class to obtain uniform correlation peaks for each target image. Since the power spectra of the reference SDF images can be pre-calculated and stored, implementation of this FAF function will not adversely impact the processing speed of the pattern recognition system.

Thereafter, the JPS as given in Eq. (18) is multiplied by the FAF transfer function as given by Eq. (19) to yield an enhanced JPS as:

$$P_f(u, v) = \frac{2C(u, v)\left[\sum_{i=1}^{M} \sum_{j=1}^{K} R_{SDFi}(u, v) T^*_j(u, v) \Phi^2(u, v) + \sum_{i=1}^{M} \sum_{j=1, j\neq i}^{K} R^*_{SDFi}(u, v) T_j(u, v)\right]}{D(u, v) + \sum_{i=1}^{M} |R_{SDFi}(u, v)|^2} \qquad (20)$$

Inverse Fourier transformation 344 of the signal in Eq. (20) will finally result in single and very sharp correlation peak of uniform height 346 for each potential target object of the reference class present in the input scene.

Figure 4:
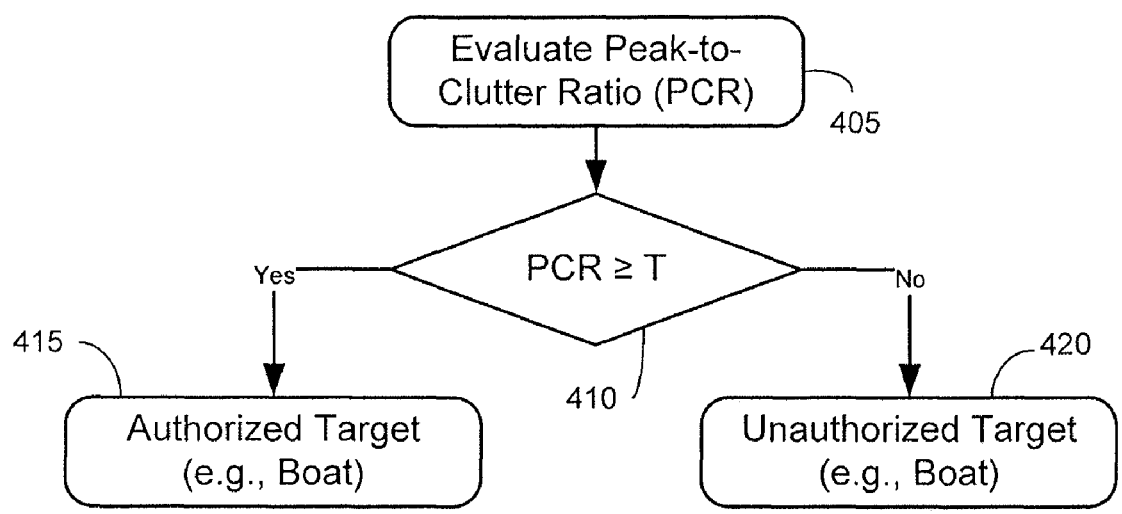
FIG. 4 illustrates a discriminating process to further identify targets.

A target discrimination process is used to realize the final correlation decision on the presence of a classified target in the input image as illustrated in FIG. 4. The absolute value of the correlation peak may not always give the correct information about the presence of a target, because even a non-target may produce a higher correlation peak than a target does, depending upon the illumination of the input scene. Therefore, a different parameter, named the peak-to-clutter ratio (PCR), is employed for the decision process which is measured from the correlation output. The PCR value 405 can be determined as:

$$PCR = \frac{C_{max}}{C_{clutter}} \quad (21)$$

where $C_{max}$ is the maximum value of the correlation output, and $C_{clutter}$ is the correlation peak intensity of the background clutter. The value of PCR is then compared with a threshold value, T, to determine 410 whether there is a target present in the input image using the following hypotheses.

PCR≧T, Target 415

PCR<T, Non-target 420 (22)

A detailed computer simulation program has been developed using MATLAB® computer software to investigate the performance of the pattern recognition technique with invariance to distortions. For this purpose, sample real life images of different small boats were employed in simulation.

Figure 5:
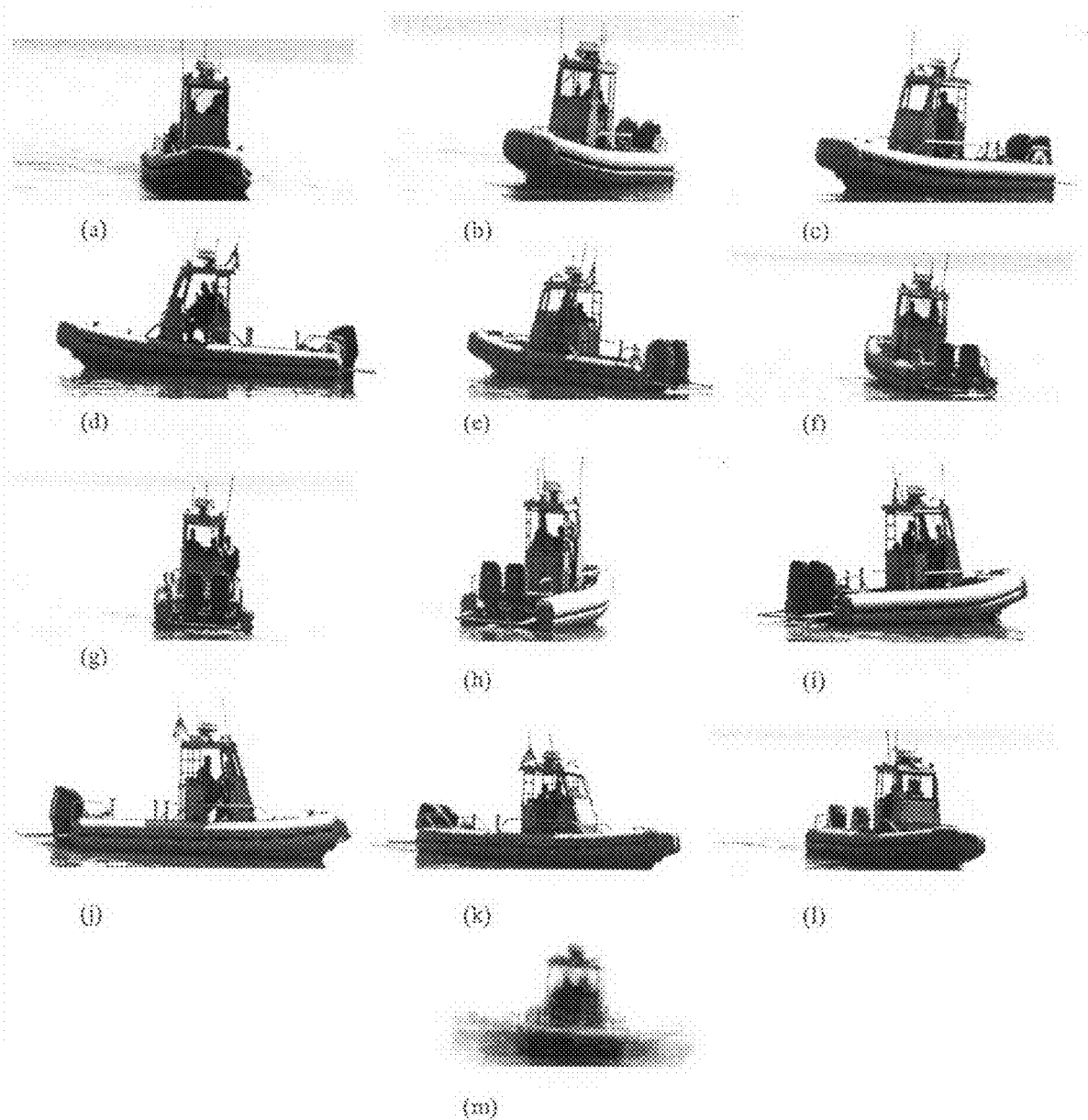
FIGS. 5(a)-(l) represent a set of training images, with FIG. 5(m) being an SDF image.

FIG. 5 illustrates a sample case used to generate a synthetic discriminant function (SDF). A total of 12 images (shown in FIGS. 5(a)-(l)) of a particular boat in different orientations having out-of-plane rotations were considered as the set of training images. The process described pertaining to FIG. 3 above was applied to these images and a composite SDF reference image was obtained, as shown in FIG. 5(m).

Figure 6:
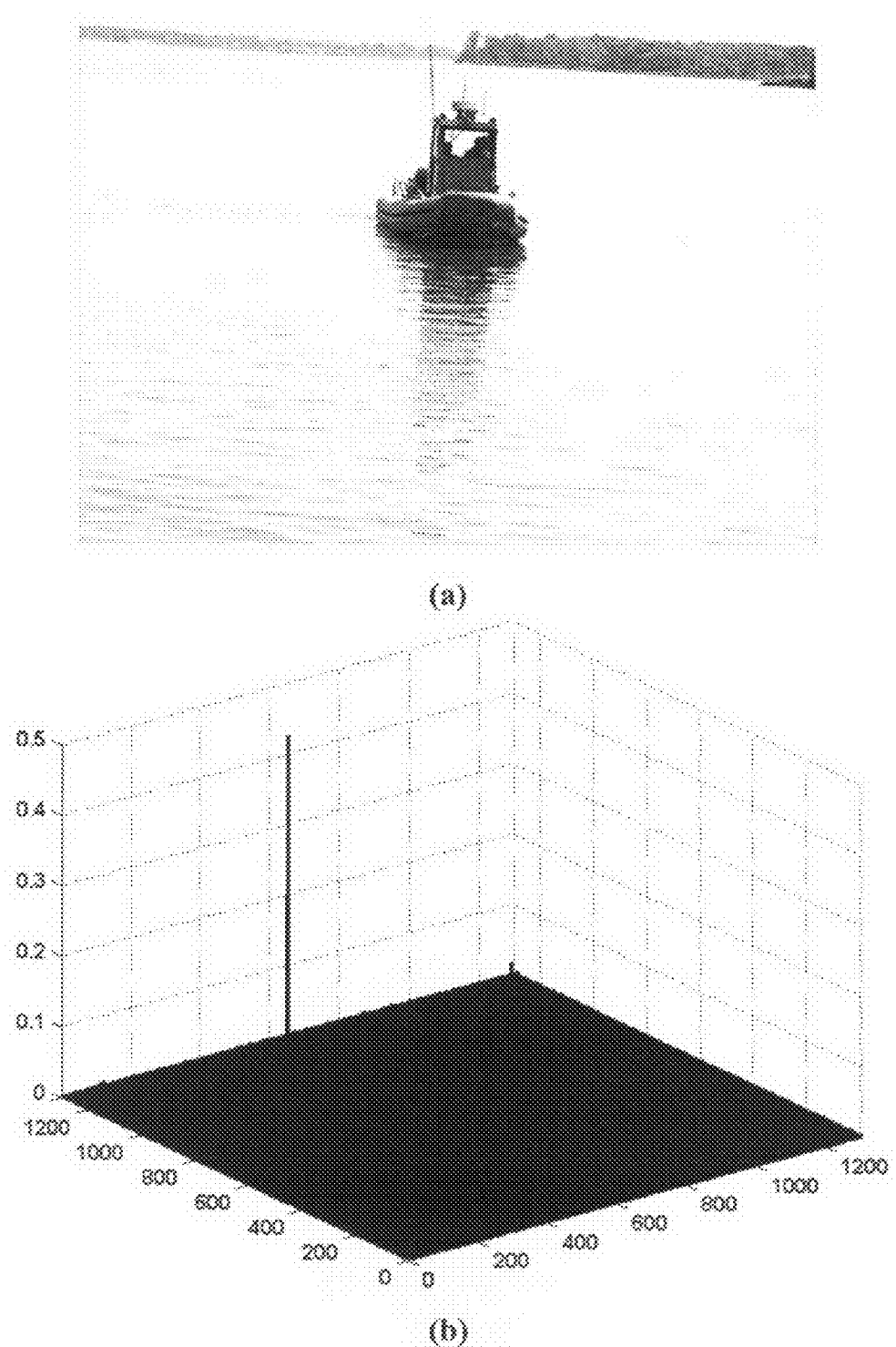
FIG. 6(a) is an input image and FIG. 6(b) is a correlation output.

Next, the SDF image of FIG. 5(m) was employed as the composite SDF reference image for the shifted phase-encoded JTC technique. FIG. 6(a) shows an input image that includes the designated boat in a background having trees and other objects. The whole image (without doing any preprocessing like segmentation or enhancement) is applied to the proposed SPFJTC technique to produce the final correlation output. The correlation output is illustrated in FIG. 6(b), where it can be observed that it contains a delta-like peak indicating that the technique successfully recognized the target boat even in the presence of other objects in the input image. Moreover, the technique produced negligible correlation for the background and other non-target objects demonstrating that any non-target object present in the input image the technique is efficiently rejected. The high peak-to-clutter ratio of the correlation result provides an excellent discrimination between the target and other objects in the image to derive further decision-making results for practical applications.

Figure 7:
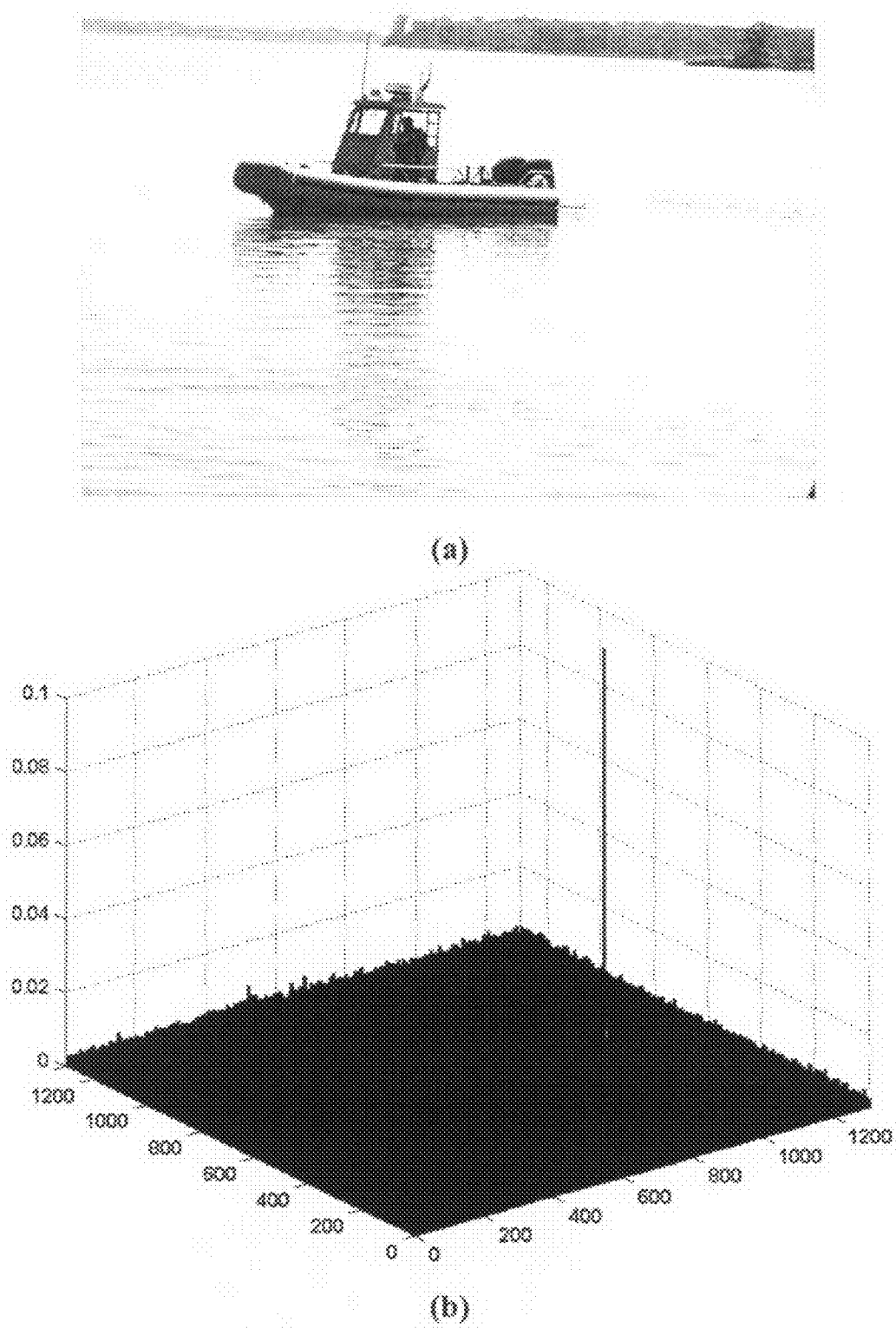
FIG. 7(a) is an input image and FIG. 7(b) is a correlation output.

FIG. 7(a) shows another input image with the same boat but at a different orientation. The same composite SDF reference image of FIG. 5(m) was employed with the SPFJCT technique and the correlation output was obtained, as shown in FIG. 7(b). The technique efficiently recognized the target and rejected any non-target objects present in the input image.

Similar experiments were carried out with various other orientations of the same boat, and in each case the technique successfully recognized the boat while rejecting any non-target object.

Figure 8:
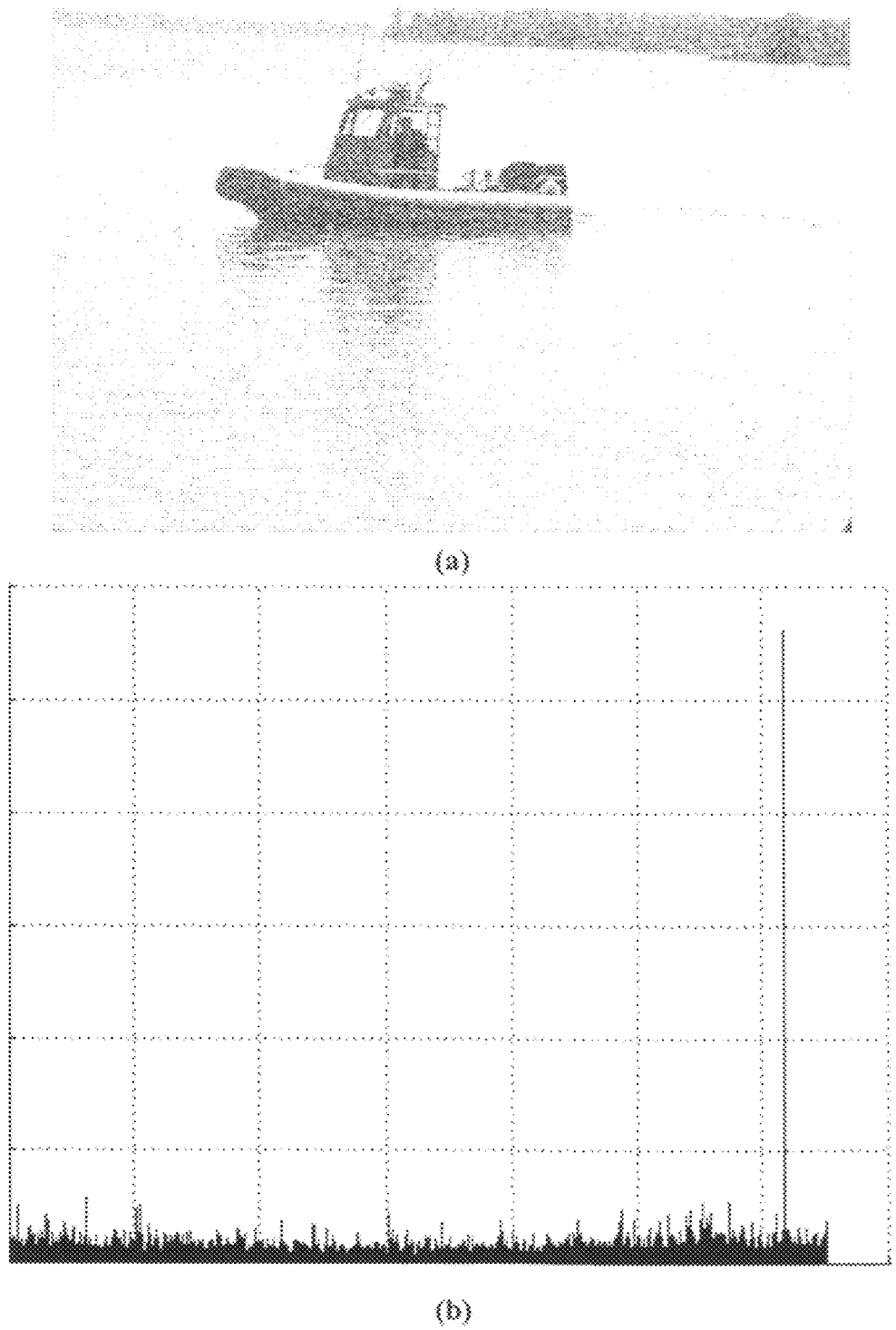
FIG. 8(a) is an input image and FIG. 8(b) is a correlation output.

Next, the technique was applied to a noisy input image to simulate tougher environmental conditions (e.g., fog) while taking the boat image. FIG. 8(a) shows an input image with random noise added to the original image. The input image was degraded such that typical target detection techniques would fail to recognize the boat. The same composite SDF reference image and detection technique were applied to this input image resulting in a correlation performance as shown in FIG. 8(b). It can be observed that the technique was successful in detecting the target efficiently.

Figure 9:
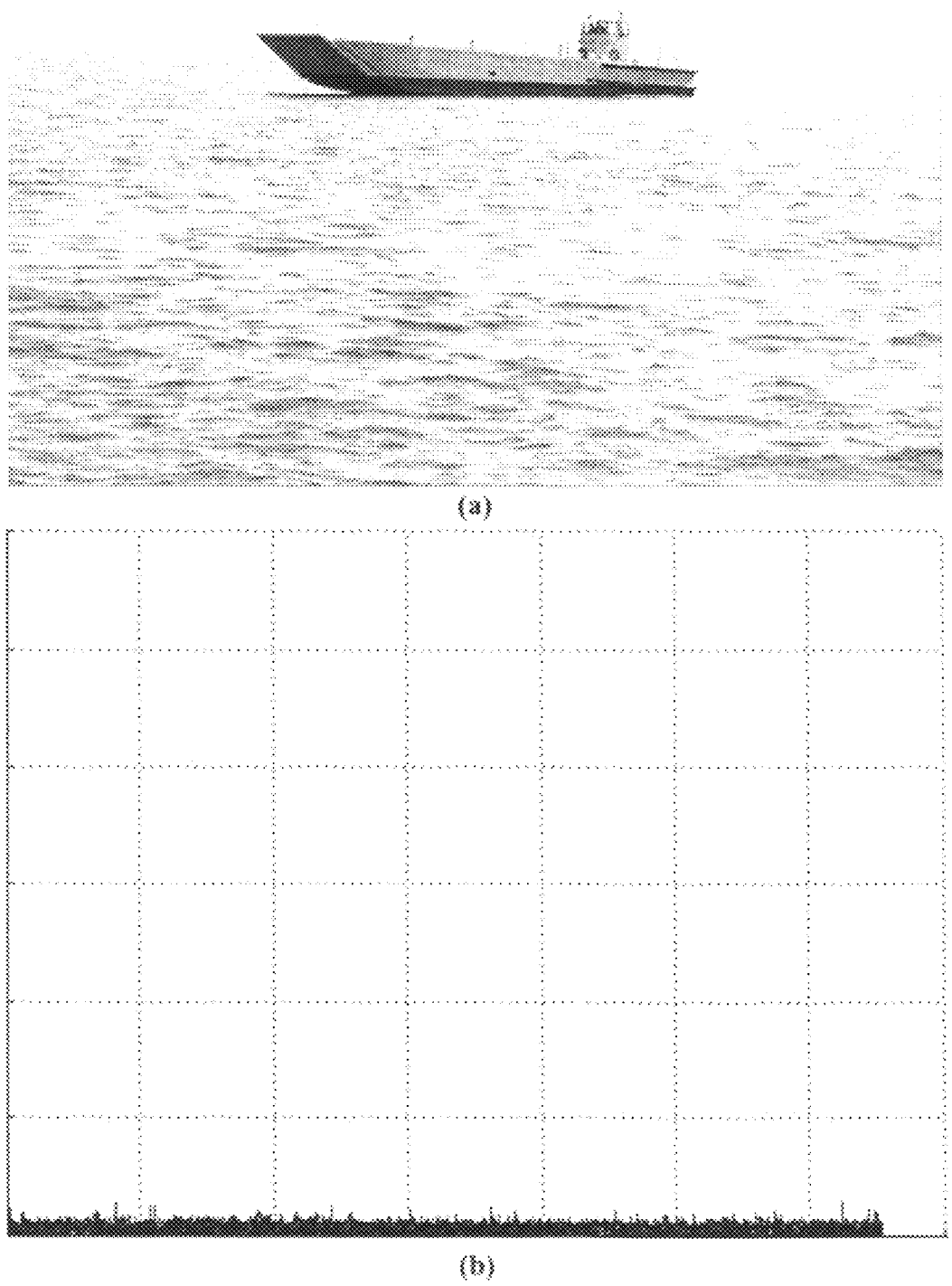
FIG. 9(a) is an input image and FIG. 9(b) is a correlation output.

In another example, an input image including a different (non-target) boat was employed as shown in FIG. 9(a). The correlation output shown in FIG. 9(b) clearly shows that the technique did not generate any significant peak because the boat does not belong to the reference class. Thus, the technique did not yield a false positive.

Figure 10:
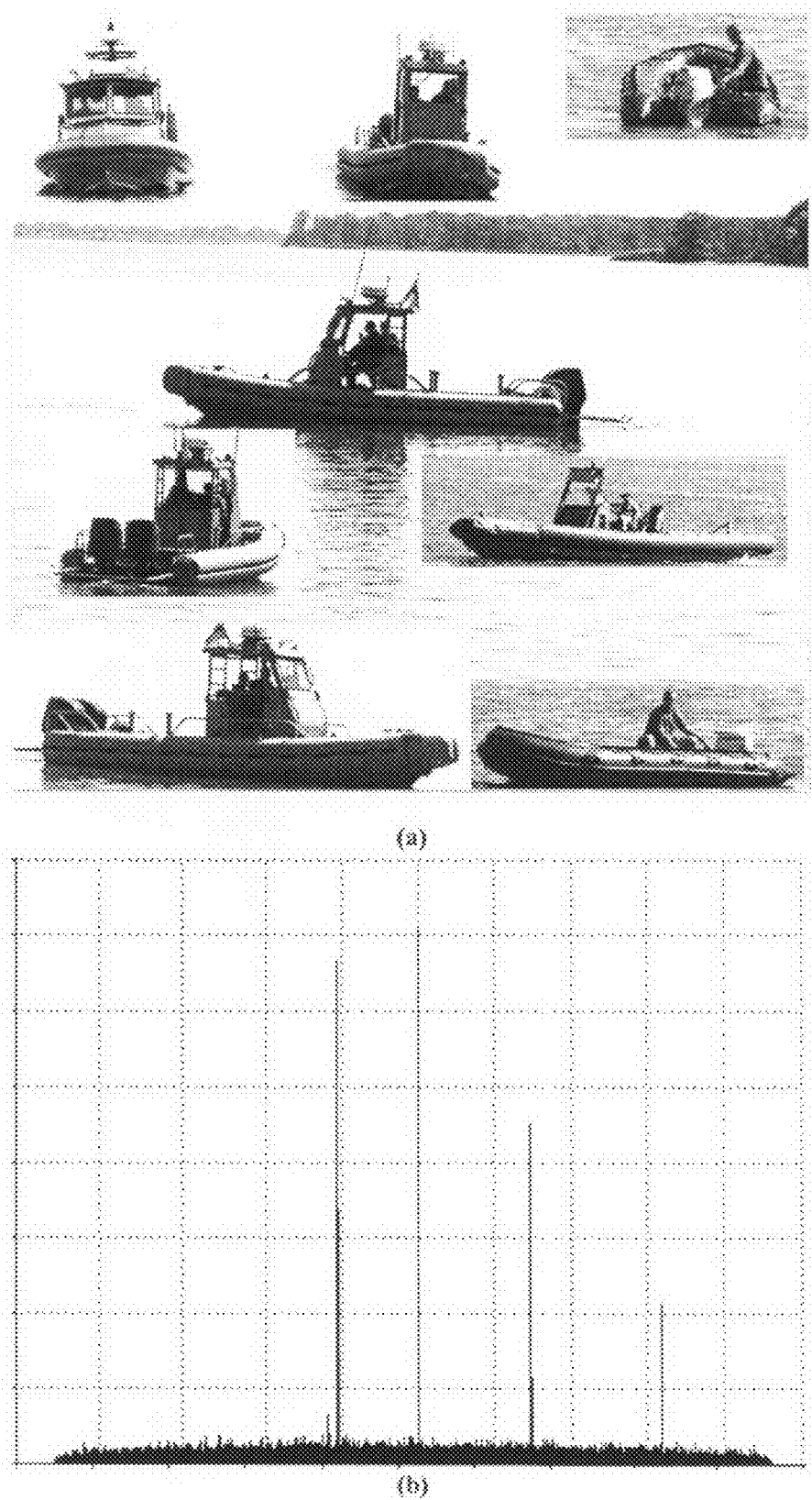
FIG. 10(a) is an input image and FIG. 10(b) is a correlation output.

To investigate the capability of the system for multiple target detection, a joint image, as shown in FIG. 10(a), was employed that contained four boats of interest at different orientations and four other non-target boats. The same composite SDF reference image and SPFJTC technique were employed to evaluate the correlation performance. FIG. 10(b) illustrates that the technique still succeeded in detecting all four target boats and in rejecting the non-target boats and other objects in the input image.

Figure 11:
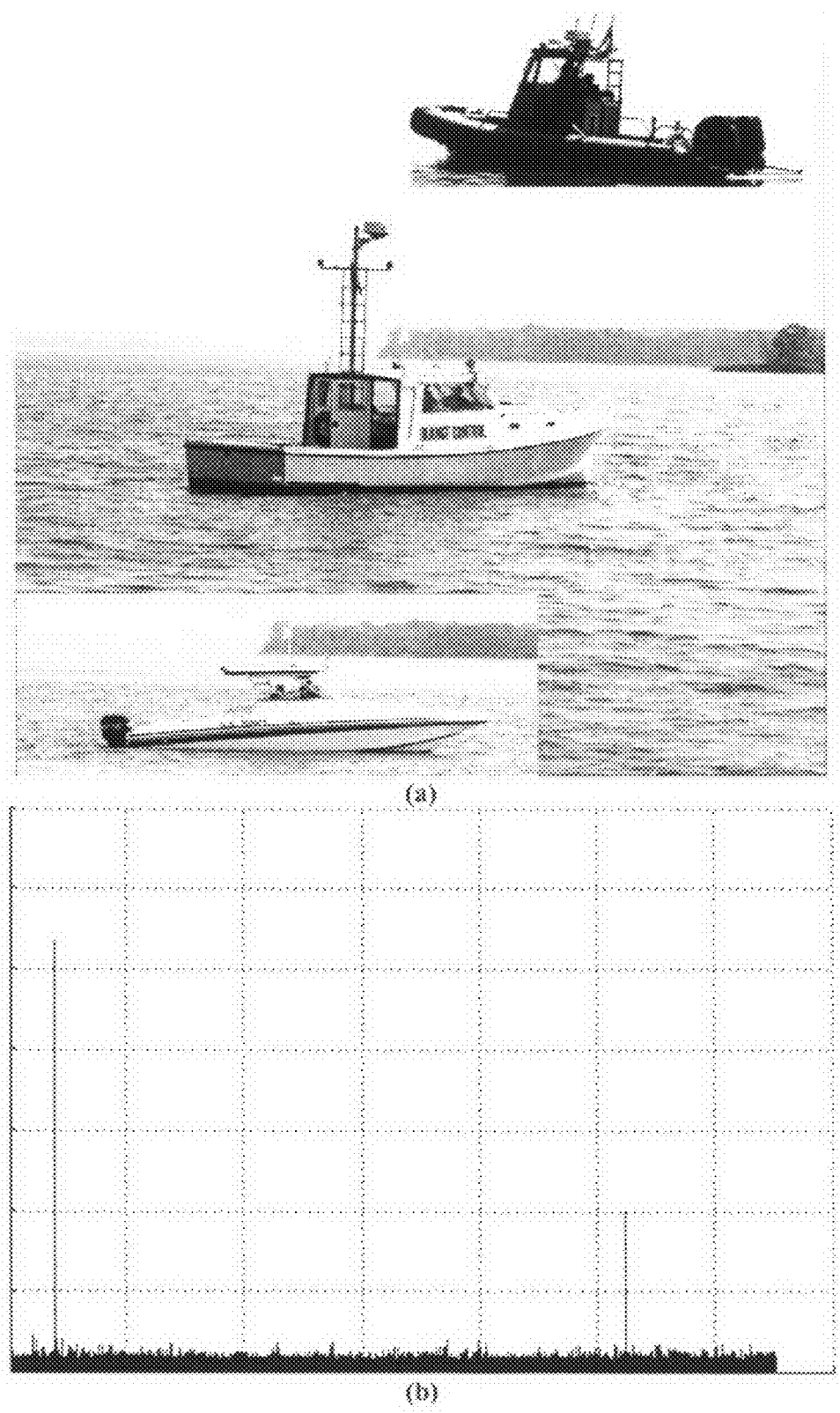
FIG. 11(a) is an input image and FIG. 11(b) is a correlation output.

The technique was further tested in a class-associative pattern recognition application. A class was formed that included the boats of interest and a composite SDF reference image was generated for this purpose. Then, the composite SDF reference image was employed as the reference image for SPFJTC processing for the input image shown in FIG. 11(a). The input image contains two boats of the reference class, one at the top and the other in the middle, and a non-target boat at the bottom. The correlation results illustrated in FIG. 11(b) demonstrate that the technique can efficiently recognize all boats of the reference class simultaneously and reject any or all non-target boats.

Figure 12:
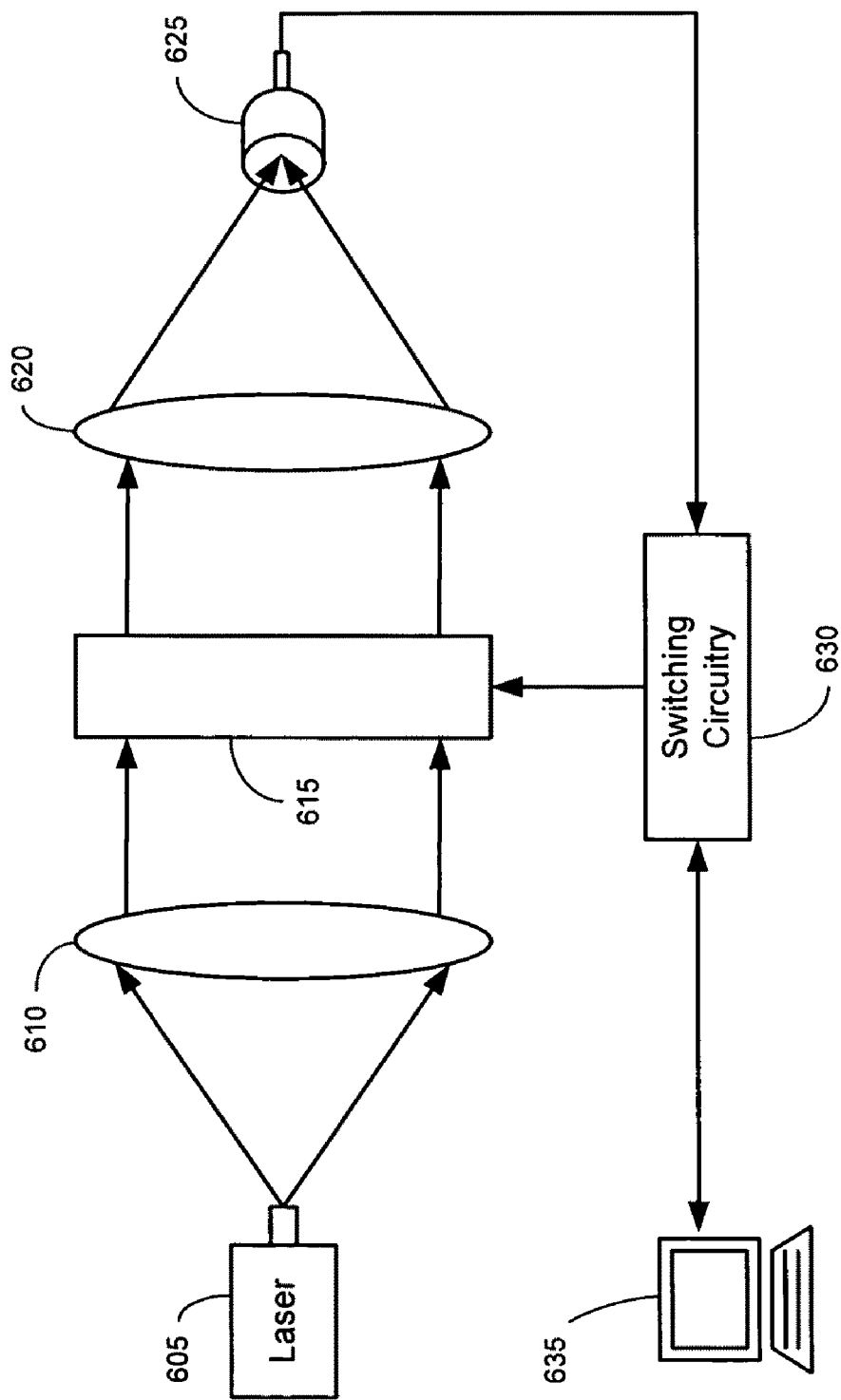
FIG. 12 is an architecture for an optical implementation embodiment of the technique.

The present invention may be implemented by either an optical Fourier lens system or by a digital system. An architecture embodiment for optical implementation of the proposed pattern recognition technique is shown in FIG. 12.

An optical system may be based on an optical device such as a lens that performs Fourier transformation of an image placed at the focal plane, while the transformed image is displayed at the other focal plane. Such a system includes a laser light source 605 to provide a coherent monochromatic light for the base carrier signal. The laser light may be directed into a collimating lens 610 to produce a parallel beam. The phase-encoded reference image and the given input image are introduced to the optical system through a spatial light modulator (SLM) 615. Thus the coherent light passing through the SLM is modulated by the joint image and then fed into a Fourier lens 620 that performs the Fourier transformation. The transformed light is then captured by a recording device 625, such as a camera having charged coupled device (CCD) array, to record the intensity of the spectral signal known as the joint power spectrum (JPS) of the joint input image. The JPS signal is again introduced to the optical system for inverse Fourier transformation. The optical system may have two sets of SLM and lens, while the second set is used for inverse transformation. Otherwise, the same setup can be used feeding the JPS to the same SLM used earlier through a switching circuit 630. The Fourier lens will then perform inverse transformation and the CCD camera will finally record the magnitude which yields the final correlation signal. The phase mask and the fringe-adjusted filter can also be implemented through the use of SLMs. A hosting computer 635 stores the database of reference SDF images and controls the overall modulation and transformation operations.

Other types of Fourier-transforming devices may be used. For example, the Fourier-transforming device may comprise refractive, reflective, and diffractive optical elements, or active liquid crystal. A reflective system may be designed by using a parabolic mirror and placing a linear image sensor in the focal point.

In a digital system, the input image is converted to digital image data. A Fourier computation module is substituted for the optical Fourier device to enable the application of the Fourier transformation. For example, an image-capture array may include a CCD configured to generate electronic signals that are transferred to a computation module. The Fourier computation module is configured to Fourier transform the received signals. Quantitative methods may also be applied to create the separate correlation signal and corresponding signal modulation. The system and its algorithms can thus be implemented within various hardware systems.

The present disclosure describes an efficient and high-speed optical image processing system having class-associative pattern recognition algorithm for identifying a class of targets. The classical joint transform correlation (JTC) technique has been modified by including phase-encoding and phase-shifting of the reference image which produces a single peak for each target object, and thus ensures better utilization of the space bandwidth product. An enhanced fringe-adjusted filter is developed to ensure generation of delta-like sharp correlation peaks for each target while rejecting all non-target objects. A synthetic discriminant function (SDF) is developed from the possible variations of the targets which yields distortion-invariant detection performance.

The technique lends itself to high-speed performance, since all processing can be done in the optical domain, where the number of steps and weight values remain the same for any kind of input image. Computer simulation results verify the effectiveness of the technique with various input images and noisy environments.

Optical recognition systems may find application in, among others, the detection of unauthorized vessels in the port area; gate control for vehicles/vessels/objects; automatic identification of objects of interest in the process industry; automatic identification of animals or weeds, etc. in agricultural applications; automatic detection of unauthorized vehicle/object in military applications.

An aspect of the optical recognition system described herein is that it does not require any image enhancement or segmentation process. Instead, the given input image can be applied directly to the technique. Another aspect of the technique is that it generates a single correlation peak for each target and hence makes the best use of the space-bandwidth capacity of the system, which also helps in correctly locating the position of the target. Further, the system yields a very high discrimination between the target and non-target correlation peaks, which makes the decision on the presence of a target easy, accurate and straightforward. The parameters of the system remain constant irrespective of the input image, which makes the system fully automatic. With respect to efficiency and effectiveness, the probability of missing a target or of producing a false positive or false negative has been found to be very low, the system functions well in noisy environments, and the high speed of the system enables real-time or near instantaneous operation. The performance of the pattern recognition technique is invariant to scale, rotation and illumination distortions in the input image.

As will be appreciated by one of skill in the art, the present invention may be embodied as a method, system, or on a computer readable medium. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer readable medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any prompts associated with the present invention may be presented and responded to via a graphical user interface (GUI) presented on the display of the mobile communications device or the like. Prompts may also be audible, vibrating, etc.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A distortion invariant method of detecting the presence of one or more predefined targets in an input image comprising:
   correlating the input image and a synthetic discriminant function (SDF) reference image obtained from a plurality of training images in a shift phase-encoded fringe-adjusted joint transform correlation (SPFJTC) correlator yielding a correlation output;
   determining a peak-to-clutter ratio (PCR) for the correlation output; and
   comparing the PCR to a threshold value such that one of the predefined targets is present in the input image when the PCR is greater than or equal to the threshold value.

2. The method of claim 1 wherein the SDF reference image is obtained from a plurality of training images by:
   (a) constructing a synthesized weighted average function of the training images according to:

$$r_{SDF}(x, y) = \frac{\sum_{i=1}^{N} a_i r_i(x, y)}{\sum_{i=1}^{N} a_i}$$

wherein $a_i$ represents a coefficient for each training image;
   (b) initializing the $a_i$ coefficients to unity;
   (c) calculating an SDF reference image for each iteration;
   (d) creating a correlation matrix by comparing each training image with the current SDF reference image according to:

$$\text{corr}_i^k(x,y) = r_{SDF}^k(x,y) \oplus r_i(x,y)$$

where k is the iteration number and $\oplus$ represents the correlation operation;
   (e) determining the correlation peak intensities for each training image;
   (f) determining an error value based on the maximum correlation peak intensity and minimum correlation peak intensity among the training images according to:

$$\xi^k = \frac{(C_{max}^k - C_{min}^k)}{C_{max}^k}$$

where $\xi^k$ is the error calculated in the k-th iteration and $C_{max}^k$ and $C_{min}^k$ are the maximum and the minimum correlation peaks computed in the k-th iteration; and
   (g) if the error value is not within a predetermined threshold, then
   (h) updating the $a_i$ coefficients for the next iteration according to:

$$a_i^{k+1} = a_i^k + (C_{max}^k - C_i^k)\delta$$

where $\delta$ is a relaxation factor that determines the rate of changing the coefficients from one iteration to the next; and
   (i) repeating steps (c) through (g) until the error value is within the predefined threshold.

3. The method of claim 2 wherein the correlation output for a single target is determined by:
   (a) performing a Fourier transform on the SDF reference image associated with the target;
   (b) feeding the SDF reference image into two parallel processing channels wherein the second channel applies a 180° phase shift;

(c) applying a random phase mask to each channel;
(d) performing an inverse Fourier transform on each channel;
(e) introducing the input image to each channel;
(f) performing a Fourier transform on each channel;
(g) calculating the joint power spectrum (JPS) from individual signals in each channel;
(h) determining the difference in the JPS between the channels;
(i) applying the random phase mask to the JPS difference;
(j) applying a fringe-adjusted filter (FAF) to obtain an enhanced JPS; and
(k) performing an inverse Fourier transform on the enhanced JPS to obtain the correlation output for the target.

4. The method of claim 3 wherein the PCR is calculated as: PCR=$C_{max}/C_{clutter}$ where $C_{max}$ is the maximum value of the correlation output and $C_{clutter}$ is the correlation peak intensity of the background clutter.

5. The method of claim 2 wherein the correlation output for multiple targets is determined by:
(a) combining all of the SDF reference images to form a composite SDF reference image;
(b) performing a Fourier transform on the composite SDF reference image;
(b) feeding the composite SDF reference image into two parallel processing channels wherein the second channel applies a 180° phase shift;
(c) applying a random phase mask to each channel;
(d) performing an inverse Fourier transform on each channel;
(e) introducing the input image to each channel;
(f) performing a Fourier transform on each channel;
(g) calculating the joint power spectrum (JPS) from individual signals in each channel;
(h) determining the difference in the JPS between the channels;
(i) applying the random phase mask to the JPS difference;
(j) applying a fringe-adjusted filter (FAF) to obtain an enhanced JPS; and
(k) performing an inverse Fourier transform on the enhanced JPS to obtain the correlation output for each target.

6. The method of claim 5 wherein the PCR is calculated as: PCR=$C_{max}/C_{clutter}$ where $C_{max}$ is the maximum value of the correlation output and $C_{clutter}$ is the correlation peak intensity of the background clutter.

7. A non-transitory computer readable medium storing a computer program product for distortion invariant detection of the presence of one or more predefined targets in an input image, the computer readable medium comprising:
computer program code for correlating the input image and a synthetic discriminant function (SDF) reference image obtained from a plurality of training images in a shift phase-encoded fringe-adjusted joint transform correlation (SPFJTC) correlator yielding a correlation output;
computer program code for determining a peak-to-clutter ratio (PCR) for the correlation output; and
computer program code for comparing the PCR to a threshold value such that one of the predefined targets is present in the input image when the PCR is greater than or equal to the threshold value.

8. The non-transitory computer readable medium of claim 7 wherein the SDF reference image is obtained from a plurality of training images by:

(a) computer program code for constructing a synthesized weighted average function of the training images according to:

$$r_{SDF}(x, y) = \frac{\sum_{i=1}^{N} a_i r_i(x, y)}{\sum_{i=1}^{N} a_i}$$

wherein $a_i$ represents a coefficient for each training image;
(b) computer program code for initializing the $a_i$ coefficients to unity;
(c) computer program code for alculating an SDF reference image for each iteration;
(d) computer program code for creating a correlation matrix by comparing each training image with the current SDF reference image according to:

$corr_i^k(x,y) = r_{SDF}^k(x,y) \oplus r_i(x,y)$ where k is the iteration number and $\oplus$ represents the correlation operation;
(e) computer program code for determining the correlation peak intensities for each training image;
(f) computer program code for determining an error value based on the maximum correlation peak intensity and minimum correlation peak intensity among the training images according to:

$$\xi^k = \frac{(C_{max}^k - C_{min}^k)}{C_{max}^k}$$

where $\xi^k$ is the error calculated in the k-th iteration and $C_{max}^k$ and $C_{min}^k$ are the maximum and the minimum correlation peaks computed in the k-th iteration; and
(g) if the error value is not within a predetermined threshold, then
(h) computer program code for updating the $a_i$ coefficients for the next iteration according to:

$a_i^{k+1} = a_i^k + (C_{max}^k - C_i^k)\delta$ where $\delta$ is a relaxation factor that determines the rate of changing the coefficients from one iteration to the next; and
(i) computer program code for repeating steps (c) through (g) until the error value is within the predefined threshold.

9. The non-transitory computer readable medium of claim 8 wherein the correlation output for a single target is determined by:
(a) computer program code for performing a Fourier transform on the SDF reference image associated with the target;
(b) computer program code for feeding the SDF reference image into two parallel processing channels wherein the second channel applies a 180° phase shift;
(c) computer program code for applying a random phase mask to each channel;
(d) computer program code for performing an inverse Fourier transform on each channel;
(e) computer program code for introducing the input image to each channel;
(f) computer program code for performing a Fourier transform on each channel;
(g) computer program code for calculating the joint power spectrum (JPS) from individual signals in each channel;

(h) computer program code for determining the difference in the JPS between the channels;
(i) computer program code for applying the random phase mask to the JPS difference;
(j) computer program code for applying a fringe-adjusted filter (FAF) to obtain an enhanced JPS; and
(k) performing an inverse Fourier transform on the enhanced JPS to obtain the correlation output for the target.

10. The non-transitory computer readable medium of claim 9 wherein the PCR is calculated as: PCR=$C_{max}/C_{clutter}$ where $C_{max}$ is the maximum value of the correlation output and $C_{clutter}$ is the correlation peak intensity of the background clutter.

11. The non-transitory computer readable medium of claim 8 wherein the correlation output for multiple targets is determined by:
(a) computer program code for combining all of the SDF reference images to form a composite SDF reference image;
(b) computer program code for performing a Fourier transform on the composite SDF reference image;
(b) computer program code for feeding the composite SDF reference image into two parallel processing channels wherein the second channel applies a 180° phase shift;
(c) computer program code for applying a random phase mask to each channel;
(d) computer program code for performing an inverse Fourier transform on each channel;
(e) computer program code for introducing the input image to each channel;
(f) computer program code for performing a Fourier transform on each channel;
(g) computer program code for calculating the joint power spectrum (JPS) from individual signals in each channel;
(h) computer program code for determining the difference in the JPS between the channels;
(i) computer program code for applying the random phase mask to the JPS difference;
(j) computer program code for applying a fringe-adjusted filter (FAF) to obtain an enhanced JPS; and
(k) computer program code for performing an inverse Fourier transform on the enhanced JPS to obtain the correlation output for each target.

12. The non-transitory computer readable medium of claim 11 wherein the PCR is calculated as: PCR=$C_{max}/C_{clutter}$ where $C_{max}$ is the maximum value of the correlation output and $C_{clutter}$ is the correlation peak intensity of the background clutter.

13. A distortion invariant system of detecting the presence of one or more predefined targets in an input image comprising:
correlation means for correlating the input image and a synthetic discriminant function (SDF) reference image obtained from a plurality of training images in a shift phase-encoded fringe-adjusted joint transform correlation (SPFJTC) correlator yielding a correlation output;
PCR means for determining a peak-to-clutter ratio (PCR) for the correlation output; and
means for comparing the PCR to a threshold value such that one of the predefined targets is present in the input image when the PCR is greater than or equal to the threshold value.

14. The system of claim 13 wherein the SDF reference image is obtained from a plurality of training images by executing instructions in a processor that:

(a) construct a synthesized weighted average function of the training images according to:

$$r_{SDF}(x, y) = \frac{\sum_{i=1}^{N} a_i r_i(x, y)}{\sum_{i=1}^{N} a_i}$$

wherein $a_i$ represents a coefficient for each training image;
(b) initialize the $a_i$ coefficients to unity;
(c) calculate an SDF reference image for each iteration;
(d) create a correlation matrix by comparing each training image with the current SDF reference image according to:

$$\text{corr}_i^k(x,y) = r_{SDF}^k(x,y) \oplus r_i(x,y)$$

where k is the iteration number and $\oplus$ represents the correlation operation;
(e) determine the correlation peak intensities for each training image;
(f) determine an error value based on the maximum correlation peak intensity and minimum correlation peak intensity among the training images according to:

$$\xi^k = \frac{(C_{max}^k - C_{min}^k)}{C_{max}^k}$$

where $\xi^k$ is the error calculated in the k-th iteration and $C_{max}^k$ and $C_{min}^k$ are the maximum and the minimum correlation peaks computed in the k-th iteration; and
(g) if the error value is not within a predetermined threshold, then
(h) update the $a_i$ coefficients for the next iteration according to:

$$a_i^{k+1} = a_i^k + (C_{max}^k - C_i^k)\delta$$

where $\delta$ is a relaxation factor that determines the rate of changing the coefficients from one iteration to the next; and
(i) repeat steps (c) through (g) until the error value is within the predefined threshold.

15. The system of claim 14 wherein the correlation output for a single target is determined by executing instructions in a processor that:
(a) perform a Fourier transform on the SDF reference image associated with the target;
(b) feed the SDF reference image into two parallel processing channels wherein the second channel applies a 180° phase shift;
(c) apply a random phase mask to each channel;
(d) perform an inverse Fourier transform on each channel;
(e) introduce the input image to each channel;
(f) perform a Fourier transform on each channel;
(g) calculate the joint power spectrum (JPS) from individual signals in each channel;
(h) determine the difference in the JPS between the channels;
(i) apply the random phase mask to the JPS difference;
(j) apply a fringe-adjusted filter (FAF) to obtain an enhanced JPS; and
(k) perform an inverse Fourier transform on the enhanced JPS to obtain the correlation output for the target.

16. The system of claim 15 wherein the PCR is calculated by executing instructions in a processor wherein PCR=$C_{max}/$ $C_{clutter}$ where $C_{max}$ is the maximum value of the correlation output and $C_{clutter}$ is the correlation peak intensity of the background clutter.

17. The system of claim 14 wherein the correlation output for multiple targets is determined by executing instructions in a processor that:
(a) combine all of the SDF reference images to form a composite SDF reference image;
(b) perform a Fourier transform on the composite SDF reference image;
(b) feed the composite SDF reference image into two parallel processing channels wherein the second channel applies a 180° phase shift;
(c) apply a random phase mask to each channel;
(d) perform an inverse Fourier transform on each channel;
(e) introduce the input image to each channel;
(f) perform a Fourier transform on each channel;
(g) calculate the joint power spectrum (JPS) from individual signals in each channel;
(h) determine the difference in the JPS between the channels;
(i) apply the random phase mask to the JPS difference;
(j) applying a fringe-adjusted filter (FAF) to obtain an enhanced JPS; and
(k) perform an inverse Fourier transform on the enhanced JPS to obtain the correlation output for each target.

18. The system of claim 17 wherein the PCR is calculated by executing instructions in a processor wherein $PCR = C_{max}/C_{clutter}$ where $C_{max}$ is the maximum value of the correlation output and $C_{clutter}$ is the correlation peak intensity of the background clutter.

* * * * *